March 31, 1964  J. A. HARRIS  3,127,108
SPRINKLER CONTROL SYSTEM
Filed April 17, 1958  3 Sheets-Sheet 1
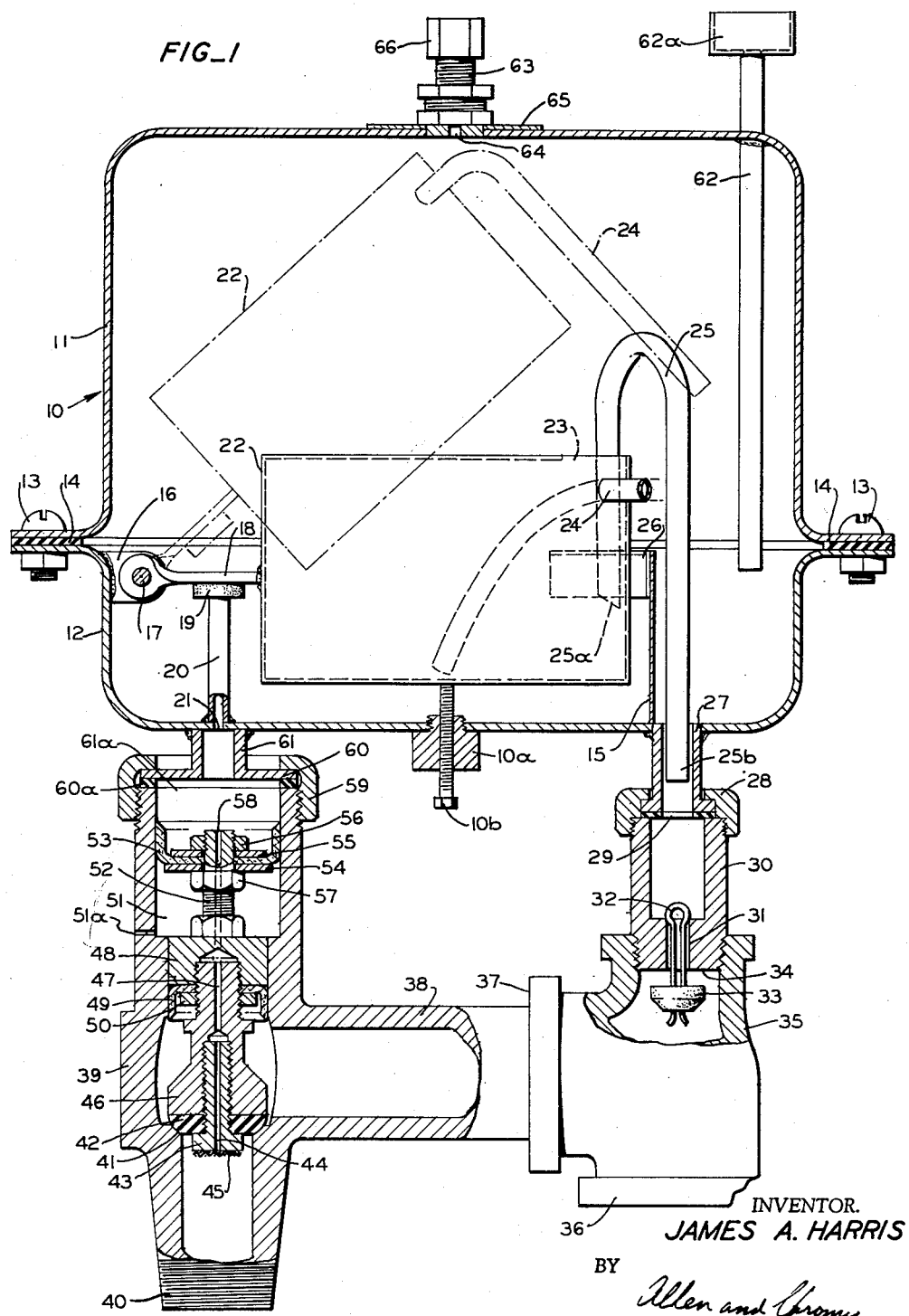
FIG_1
INVENTOR.
JAMES A. HARRIS
BY
Allen and Chromy
ATTORNEYS March 31, 1964
J. A. HARRIS
3,127,108
SPRINKLER CONTROL SYSTEM
Filed April 17, 1958
3 Sheets-Sheet 2
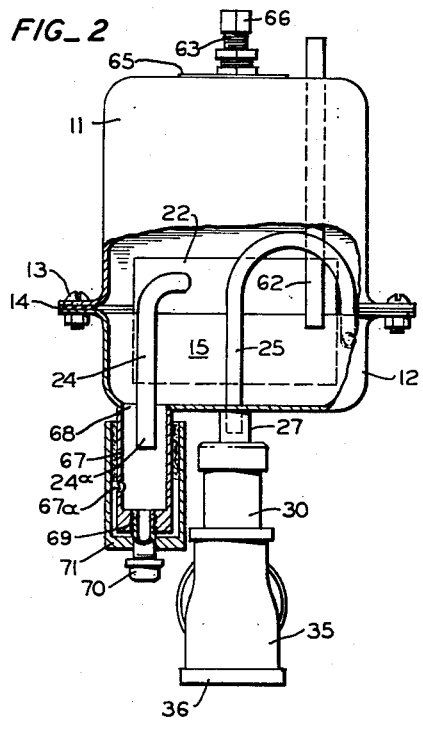
FIG_2
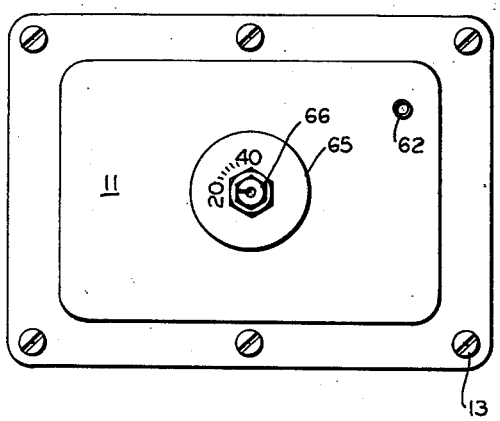
FIG_3
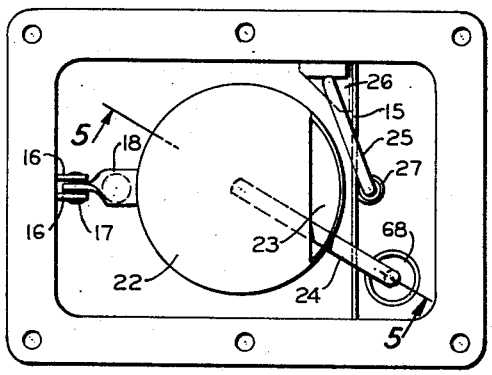
FIG_4
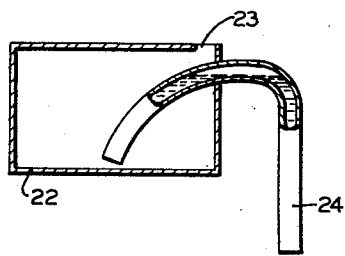
FIG_5
INVENTOR.
JAMES A. HARRIS
BY
*Allen and Chromy*
ATTORNEYS March 31, 1964     J. A. HARRIS     3,127,108
SPRINKLER CONTROL SYSTEM
Filed April 17, 1958     3 Sheets-Sheet 3
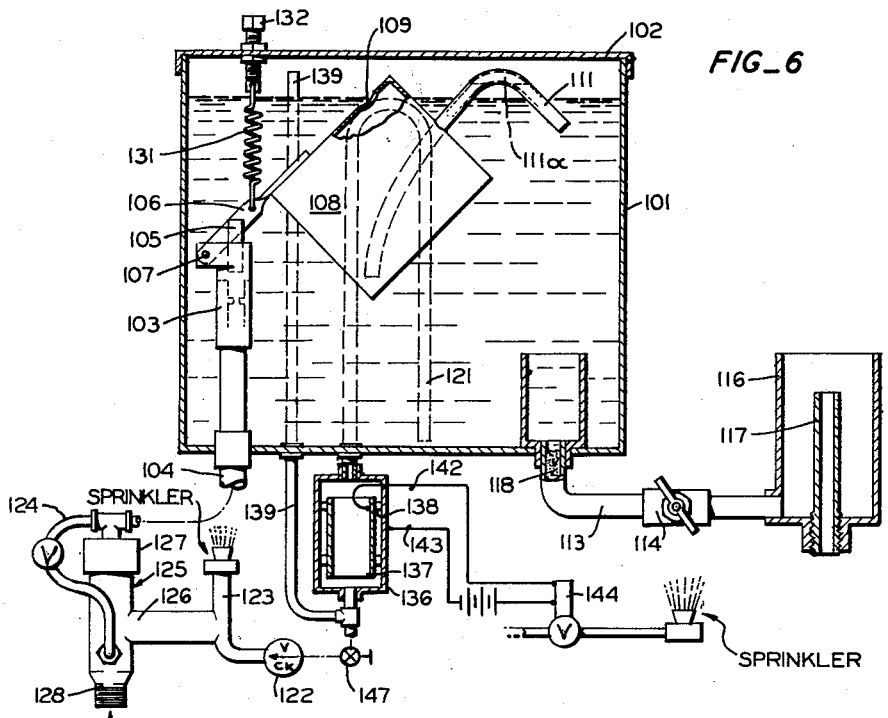
FIG_6
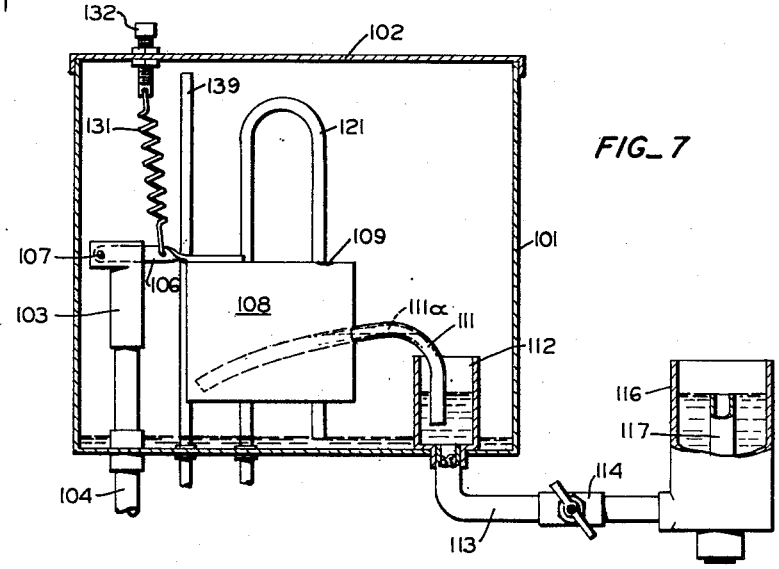
FIG_7
INVENTOR.
JAMES A. HARRIS
BY
ATTORNEYS

United States Patent Office 3,127,108
Patented Mar. 31, 1964

3,127,108
SPRINKLER CONTROL SYSTEM
James A. Harris, 61 Gregary Place, Oakland 19, Calif.
Filed Apr. 17, 1958, Ser. No. 729,211
2 Claims. (Cl. 239—65)

The present invention relates to control systems for lawn sprinklers and the like, and is concerned more particularly with an improved structure to give efficient control of the frequency of operation of the springing system, to control the length or duration of the watering by the sprinkling system and provide suitable interlocks between various sprinkler systems simultaneously under control so that more than one will not be in operation if the pressure is too low.

This application is a continuation-in-part of my application, Serial No. 457,845 filed September 23, 1954.

In the control of sprinkling systems, it is desirable to have such sprinkling systems automatically in operation, and responsive to the weather conditions in controlling the interval between waterings, so that watering will not occur after rainfall or other moisture from the air has aided in keeping the lawn moist. It is also desirable to provide for an interlocking system where a plurality of sprinkler systems are connected to the same water circuit so that only one will be in operation at the same time. In such sprinkling systems, it is also desirable to have the main sprinkler valve controlled by a smaller control or pilot valve to avoid expensive construction of the main valve and to enable economical manufacture.

The above and other objects of the invention are attained as described in connection with certain preferred embodiments of the invention, as illustrated in the accompanying drawings, in which:

FIGURE 1 is a vertical sectional view of an embodiment of this invention;

FIGURE 2 is a view in side elevation partially in section of the device shown in FIGURE 1;

FIGURE 3 is a plan view of the device shown in FIGURE 1;

FIGURE 4 is a plan view of the bottom tank section and elements positioned therein;

FIGURE 5 is a sectional view taken along the line 5—5 of FIGURE 4;

FIGURE 6 is a view of a modified form of the invention with the float in elevated position; and FIGURE 7 is a view of the form of this invention shown in FIGURE 6 with the float in its lower position.

Referring to FIGURE 1 of the drawing in detail there is illustrated a vertical sectional view of an embodiment of this invention employing a tank 10 having an upper section 11 and a bottom section 12, each of said sections having flanges which are adapted to receive the machine screws 13 for the clamping thereof against a gasket 14 so that the tank sections may be held secured together in air tight fashion. The bottom tank section 12 is provided with a partition 15 whereby this section is divided into two portions for purposes which will be apparent from the description hereinafter.

Brackets 16, shown in FIGURE 4, are attached to the inner surface of the bottom section 12 and these brackets support a pin 17 which functions as a pivot for the arm 18 that is soldered, welded or otherwise attached to the side of the flat bottom cylindrical float 22. The pivoted arm 18 is provided with a resilient member 19 of rubber or the like which is attached thereto and is adapted to engage the top of the tube 20 to seal said tube when the float is in its lower position shown in solid lines in FIGURE 1. This tube 20 is soldered, welded or otherwise attached to the bottom of the tank section 12 so that the hole 21 through this tank section registers with the hole through this tube.

The float 22 is provided with an opening 23 in the top thereof and this opening is of a configuration such as shown in FIGURE 4. A tube 24 having a substantially U-shape extends into the float 22 near the top thereof and is fastened to the wall of this float by soldering, welding, brazing or the like. One end of this tube 24 extends well into the float 22 and almost to the bottom thereof and when the float is in its lower position the other end of this tube extends into a cup 67 as shown in FIGURE 2. Another U-shaped tube 25 is adjustably supported on the partition 15 by means of the bracket 26 that is attached to this partition.

The tube 25 is adjustably supported by the bracket 26 so that the end 25a of the tube may be raised or lowered with respect to the bottom of the lower tank section 12. The end 25b of the tube 25 is adapted to be positioned in the tube 27 which is attached to the bottom of the lower tank section 12 and is soldered, welded or brazed thereto so that it opens into this lower tank section. The tube 27 is provided with a flange that is adapted to be engaged by the coupling 28 which is threaded to the upper end of the tubular member 30 so that the flange on the lower end of the tube 27 is pressed against the gasket 29 which is positioned on the upper end of the tube 30. The lower end of the tube 30 is provided with a hole 31 in which is positioned a pin 32 that extends through a sealing member 33 which is adapted to engage the surface 34 to seal the hole 31 when the sealing member 33 is brought against the surface 34 by the water pressure in the member 35.

The member 35 is in the form of a T-coupling having an inlet end 37 and an outlet end 36 which is connected to the water sprinkler system to feed water thereto. The inlet is coupled to the pipe 38 that extends laterally from the valve housing 39 which is provided with a lower threaded section 40 that is adapted to be coupled to the water supply line. The valve housing 39 is provided with a valve seat 41 that is adapted to be engaged by the sealing member 42 which is made of resilient material such as rubber, nylon and the like. The sealing member 42 is attached to the member 46 by means of the screw 43 which is provided with an axial hole 44, the bottom end of this hole being covered by a screen 45 that is attached to the screw head by solder and the like. The lower end of the hole 44 opens through the screen 45 into the water inlet cavity of the housing 39 and the upper end of this hole 44 opens into the hole 47 that extends axially through the upper portion of the member 46. This upper portion of this member is threaded into the guide member 48 which is provided with a threaded portion 52 of reduced diameter extending from the top thereof and this portion is also provided with an axial hole 58 which extends therethrough and connects with the hole 47. A packing member 49 is held against the bottom of the weight 48 by means of the threaded nut 50 which engages the threaded portion of the member 46. The upper part of the valve housing 39 is provided with a cavity 51 and the packing gasket 53 which is supported on the threaded member 52 between the washers 54 and 55 by means of the threaded nuts 56 and 57 is positioned in this cavity so that the sides of this gasket 53 engage the inner side walls of this cavity. The gasket 53 thus functions as a partition between the cavity 51 and the cavity 61a. The cavity 51 is vented to the outer atmosphere through the hole 51a that is provided near the bottom thereof. The top of the valve housing 39 is threaded to receive the threaded cap 59 which is provided with a flange for clamping the flange 60 of the tube 61 to the upper surface of the gasket 60a that is positioned on the top edge of the valve housing.

A pipe 62 is attached to the top tank section 11 and extends through this top section to the outer atmosphere.

The lower end of this pipe 62 extends down into the compartment formed by the partition 15 in the right hand side of the lower tank section 12 and the purpose of this pipe will be described hereinafter. The top tank section 11 is also provided with an adjustable air valve 63 that is attached to the outside of the top of this tank section and connects to the inside cavity in the tank through the hole 64. The cap 66 of this air valve is adjustable so that the rate at which the air from the inside of the tank is allowed to flow out through the air valve 63 may be adjusted by adjusting the cap 66 which is also provided with a small hole in the top thereof as shown in FIGURE 3. A scale 65 is associated with the air valve 63 and this scale may be calibrated in terms of time so that the length of the watering cycle may be determined by positioning the indicia on the cap 66 with respect to the calibrations of the scale 65 as will be described hereinafter.

A cup 67 is attached to the bottom of the lower tank section 12 and communicates with this tank section by the hole 68 so that the lower end 24a of the U-shaped tube 24 is adapted to extend into the cavity inside of the tube 67 when the float 22 is in its lower position as shown in FIGURE 2. The bottom of the cup 67 is provided with a threaded hole into which the tube 69 is threaded and the bottom of this tube is closed by the cap 70. Another cup 71 that is concentric with the cup 67 is supported by the tube 69 so that a small cavity is formed between the outside of the cup 67 and the inside of the cup 71. This cavity is partially filled by a wad of cotton string or the like so that water may evaporate therethrough but to prevent water from rapidly flowing out of the tank 11 while filling. The cup 71 is adjustable with respect to the cup 67 so that the water level in inner cup 67 may be raised or lowered to control frequency of operation of device whereby the cycle of operation depending upon the weather may be controlled. A hole 67a is provided in the cup 67 to communicate between the cavity inside of the cup 67 and the cavity formed between these two cups so that water may flow into this latter cavity from the inside of the cup 67.

The operation of the embodiment of this invention shown in FGURES 1–5 is as follows: When the float 22 is in its lower position as shown in FIGURE 1 and when this float is full of water the main valve 39 is closed so that the sealing member 42 thereof is in engagement with the seating surface 41. At this time air is trapped in the U-shaped syphon tube 24 and an air bubble is in the top portion of this U-shaped syphon tube as shown in FIGURE 5. As long as sufficient water remains in the inner cup 67 shown in FIGURE 2 the syphon tube 24 will not function to empty the water from the float 22. When the water level in the cup 67 is lowered sufficiently because of evaporation from the cavity between the cups 67 and 71 or any other means, the air bubble in the top portion of the syphon tube 24 will move downward toward the cup 67 and the water from the float 22 will be emptied so that when the float is substantially empty, water will start to flow into the tank through the tube 20 since the resilient pad 19 is lifted slightly from the top end of the tube 20 by water pressure supplied through the holes 44, 47 and 58 formed through the various elements of the main valve as previously described. Water is supplied through these holes from the water supply line that is connected to the threaded end 40 of the main valve housing when the pressure in the water supply line is up to normal. Water will therefore enter the cavity 61a through the holes 44, 47 and 58 and water from the cavity 61a will enter the tank section 12 through the tube 20. As this water accumulates in the bottom tank section, it raises the float 22. It will be noted that since the cross-sectional area of the hole 21 through the tube 20 is substantially larger than the cross-sectional area of the hole 58 that the water from the cavity 61a drains out faster through the hole 21 than additional water is supplied into this cavity 61a through the hole 58 thus allowing the water pressure on the lower part of the main valve to lift the seal 42 from its seat 41 so that water is supplied to the pipe 38, to the T-coupling 35 and to the water pipe connected to the end 36 of the coupling whereby the watering cycle is started.

If another set of water sprinklers that is connected to the same water supply line is turned on at the time that the float 22 is emptied, the pressure in the tube 20 is insufficient to permit water to dribble into the tank past the sealing member 19 so as to raise the float 22 until the other set of sprinklers is shut and normal pressure is restored at the main valve.

During the watering cycle, as the water rises in the tank 10, it replaces the air in the tank and consequently the water can rise only as fast as the air is released from the inside of this tank since the excess water is forced out of the tank 10 through the tube 62. This air release is controlled by the air valve 63 and the rapidity with which air is allowed to escape from the tank through the opening 64 may be controlled by the cap 66. Consequently the length of the watering cycle can be controlled by setting the cap 66 which controls the air release from the inside of the tank 10. The position of the cap 66 may be adjusted beforehand in accordance with the calibrations on the dial 65 so that the length of the watering cycle may be predetermined.

When water flows through the main valve 39 into the pipe 38 and the T-coupling 35 the water pressure causes the sealing member 33 to engage the surface 34 of the lower end of the pipe 30 and as a result the hole 31 is sealed so that water is prevented from flowing into the tank 10 through the tube 27. Consequently, the syphon tube 25 cannot function to drain water accumulated in the lower section of the tank 12 during the watering cycle.

As water flows into the tank 10 through the tube 20 and this tank gradually becomes full, the float 22 is caused to rise until it is in the upper position shown in dotted outline in FIGURE 1. With the float 22 in its uppr position and with the tank 10 substantially full of water, some of the water flows into the float 22 through the opening 23. As the float 22 fills it sinks to its lower position so that the top of the tube 20 is sealed by the sealing member 19. When the tube 20 is closed at the top thereof pressure builds up in the cavity 61a in the upper part of the main valve and when this pressure is equal to the water pressure in the inlet 40 the sealing member 42 is caused to engage the sealing surface 41 to thereby stop the flow of water through the main valve into the T-coupling 35. This result is accomplished since the area of the piston in the chamber 61a is larger than the area of the valve seal 42. Closing the main valve shuts off the flow of water into the T-coupling 35 with the result that the hole 31 is opened since the sealing member 33 is allowed to drop away from the sealing surface 34.

Opening the hole 31 allows the syphon 25 to drain the water out of the tank 10 to a level corresponding to the lower end of the tube 25a on the left hand side of the partition 15. The level on this side of the partition may be adjusted by adjusting the depth of the end 25a of this tube so that a certain amount of liquid remains under and around the lower part of the float 22. This level is different for different normal water pressures in the supply line, that is, at lower supply line pressures a higher level is desired and vice versa. The water on the right hand side of the partition 15 is of course drained completely through the tube 27.

When the float 22 was raised to its upper position, the upper part of the U-shaped syphon tube 24 provides a cavity for trapping a small amount of air as shown in the sectional view FIGURE 5. This air is trapped in this syphon tube even in the lower position of the float 22 until water from the space between the cups 67 and 71 evaporates and thereby permits the syphon tube 24 to syphon the water out of the float 22 into the cup 67.

The cup 62a functions to catch rain during rainy weather and this rain water is fed through the tube 62 into the cups 67 and 71 to replace water evaporated therefrom and thereby delay this apparatus in turning on the sprinklers. A small plug 10a is provided in the bottom of the tank 10 for the purpose of draining this tank when it is desired not to have it in operation. A small screw 10b is provided in the plug 10a to lift the float 22 a slight amount when it is desired to let water dribble into the tank to resume operation after the plug 10a has been tightened and sealed.

Referring to FIGURES 6 and 7, in this form of the invention an enclosed tank 101 is provided having a cover 102 and within which a pilot valve 103 is mounted and connected by a pipe 104 with the control chamber of the main sprinkling valve 125 which is provided with an outlet 126 leading to the sprinklers and an inlet 128 to the water supply. The main valve 125 is of conventional type and may be of a construction such as shown in FIGURE 1 of Patent No. 2,577,337 issued to Lancaster on December 4, 1951. This main valve has an auxiliary operating control chamber 127, the top of which is connected to the pipe 104 leading to the pilot valve 103 and also to the pressure inlet 128 through the bypass line 124.

The slotted piston 105 of the pilot valve 103 is controled by means including a lever 106 pivoted on the pilot valve at 107 and engaging the slot of the piston 105. The lever 106 carries a control float 108 having an opening 109 at the top and having a syphon pipe 111 for emptying the float. The syphon tank 108 is preferably flat bottomed so as to increase the initial lift on the float due to filling of the tank 101 with liquid. The pipe 111 is adapted to be disposed within and discharge into a cylindrical overflow control container 112 mounted in the bottom wall of the tank 101. The float 108 and associated parts are similar in all respects to those of float 22 previously described in connection with the description of FIGURES 1–5.

The overflow control container 112 is connected by a pipe 113 and a valve 114 to an exterior evaporation cup 116 which is exposed to any rainfall or moisture in the atmosphere. This control cup 116 has a central overflow pipe 117 threaded in the bottom wall thereof to control the level of water therein. Also if desired the pipe 113 may have fibre material 118 disposed therein so as to throttle the flow of liquid therethrough.

To facilitate rapid emptying of the tank 101 when a watering cycle is ended, a syphon 121 is mounted in the bottom wall thereof and is connected through a gravity type pressure responsive check valve 122 with the outlet pipe 123 of the main valve 125. When the sprinkler system is in operation and there is pressure in pipe 123, the check valve 122 will remain closed so that the tank 101 will be filled.

When another connected set of sprinklers is in operation, there will be reduction in pressure on the piston 105, so that if the float 108 is empty there will be an insufficient flow of water from the pilot valve 103 to cause lifting of the float 108 and overflow filling thereof. When the other set of sprinklers ceases operation and the full pressure is again available to the plunger 103, the sprinkling cycle determined by the emptying of the float 108 will commence.

The system shown in FIGURES 6 and 7 incorporates an adjustment control whereby the system can be adjusted to varying water pressures, and this control includes a tension spring 131 connected to the lever 106 at one end and at the other end to an adjustment screw 132 mounted in the cover 103 of the tank 101. It is seen that the spring 131 acts to aid the water pressure and to resist the weight in the tank 108 so that in low pressure areas where the pressure system is low, the spring 131 can be adjusted so that the float 108 will be lifted at the proper time to control the desired watering cycle.

This embodiment also includes a starting control and a timing of another set of sprinklers. For this purpose a tank 136 is connected to the lower end of syphon pipe 121 and inside of this tank a cylinder 137 is mounted by means of insulators 138. An air escape pipe 139 leads from the tank 136 to the upper part of tank 101. Also in the discharge end of the tank 136 a valve 147 is provided ahead of the check valve 122 previously described. The tank 136 and the cylinder 137 are electrically insulated from each other and are connected by respective wires 142 and 143 to a solenoid type main valve 144 for another set of sprinklers. When the water is draining from the tank 101 through the syphon 121, electrical contact will be made through the water between the tank 136 and the tube 137 so that the solenoid valve 144 is set in operation, and the interval of watering is controlled by the time required to empty the tank 136. The valve 147 provides an adjustment for controlling the rate of discharge.

The operation of the system shown in FIGURES 6 and 7 will be described beginning with the position of the parts shown in FIGURE 6 where the valve 103 has been opened by the combined influence of the piston 105 and the spring 131, and the water is flowing out from the valve 103 into the tank 101. The watering cycle has begun as soon as enough water has run into tank 101 to raise float 108 a little. When water rises, float 108 continues to rise until it can raise no further. Eventually water rises over float 108 and enters it through the opening 109. Float 108 fills and drops and the watering cycle is over. During this time it will also be noted that the check valve 122 is subject to the pressure of the water in the pipe 123, which is on the discharge side of the main valve 125, and remains closed. When the float 108 is filled, it will move from the position shown in FIGURE 6 to that shown in FIGURE 7, to shut off the main valve 125 and to stop the watering cycle.

When the watering cycle is shut off, the check valve 122 opens and the principal body of water within the tank 101 is rapidly emptied through the syphon 121, and the syphon overflow pipe 111 from the float 108 is disposed within the cup or container 112 so that the control of the interval between waterings begins. This control is adjusted by the height of the internal overflow pipe 117. As evaporation continues from the cup 116 and the water level therein is lowered to a given level, the syphon action through the pipe 111 will begin and the float 108 is emptied, as controlled through the valve 114. When empty, float 108 will rise to the position shown in FIGURE 6 and the watering cycle will begin again. When the float 108 is lifted to its upper position as shown in FIGURE 6 a bubble of air 111a is trapped in the bend of the syphon tube 111. This bubble remains in this tube until the float 108 sinks to its lower position shown in FIGURE 7 and it tends to delay the emptying of the float 108 into the container 112.

In this system it will be noted that the time of watering can be controlled by adjustment of the valve 114 which will control the overflow through the chambers 112 and 116 during filling of the tank, or it can be controlled by adjustment of the auxiliary valve in the bypass line 124 around the main valve 125, as this auxiliary valve controls the rate of flow of water to the pilot valve into the tank.

While I have shown a preferred embodiment of the invention it will be understood that the invention is capable of variation and modification from the form shown so that its scope should be limited only by the scope of the claims appended hereto.

I claim:

1. In a sprinkler system, a first sprinkler means and a second sprinkler means, a main tank, a piston-type pilot valve housed within said main tank, a main valve connected to said first sprinkler means, means controlled by said pilot valve for controlling said main valve, a discharge syphon in the main tank having a check valve and connected to the outlet of the main valve, a syphon float movably mounted in said main tank and connected to the piston of the pilot valve to be controlled thereby for movement between respective filling and emptying positions, and an evaporation control means for receiving water from said syphon float and including an outlet cup within the main tank and disposed to receive water from said syphon float, and an evaporation cup mounted exteriorly of the main tank and control means connected to said main tank for controlling the water supply to said second sprinkler means after said main valve is shut off.

2. In a sprinkler system, a first sprinkler means and a second sprinkler means, a main tank, a pilot valve for feeding water to said main tank, a main valve means controlled by said pilot valve for controlling said main valve, a syphon float movably mounted in said main tank and connected to the pilot valve to be controlled thereby for movement between respective filling and emptying positions, and an evaporation control means for receiving water from said syphon float and including an outlet cup within the main tank and disposed to receive water from said syphon float and an evaporation cup mounted exteriorly of the main tank and control means connected to said main tank for controlling the water supply to said second sprinkler means after said main valve is shut off.

References Cited in the file of this patent

UNITED STATES PATENTS

| | | |
|---|---|---|
| 2,368,832 | Hauser | Feb. 6, 1945 |
| 2,577,337 | Lancaster | Dec. 4, 1951 |
| 2,619,105 | Hauser | Nov. 25, 1952 |
| 3,006,554 | Harris | Oct. 31, 1961 |